United States Patent [19]

Ross et al.

[11] Patent Number: 4,749,664

[45] Date of Patent: * Jun. 7, 1988

[54] EMULSION-CHAR METHOD FOR MAKING FINE CERAMIC POWDERS

[75] Inventors: Sidney D. Ross, Williamstown; Galeb H. Maher, North Adams, both of Mass.; Clinton E. Hutchins, Pownal, Vt.

[73] Assignee: Sprague Electric Company, North Adams, Mass.

[*] Notice: The portion of the term of this patent subsequent to Mar. 31, 2004 has been disclaimed.

[21] Appl. No.: 947,117

[22] Filed: Dec. 29, 1986

[51] Int. Cl.$^4$ .................. C04B 35/00; C01B 13/14
[52] U.S. Cl. ......................... 501/1; 423/592; 423/593; 423/598; 423/608; 423/636
[58] Field of Search ................ 501/1; 423/592, 593, 423/598, 608, 636

[56] References Cited

U.S. PATENT DOCUMENTS

| | | | |
|---|---|---|---|
| 3,330,697 | 7/1967 | Pechini | 117/215 |
| 3,647,364 | 3/1972 | Mazdiyasni et al. | 23/51 R |
| 4,081,857 | 3/1978 | Hanold, III | 361/321 |
| 4,654,075 | 3/1987 | Cipollini | 423/593 |

FOREIGN PATENT DOCUMENTS 2032233 1/1971 Fed. Rep. of Germany .

OTHER PUBLICATIONS

D. Hennings & W. Mayr, "Thermal Decomposition of (BaTi) into Barium Titanate", Journal of Solid State Chemistry, 26, pp. 329–338, (1978).

*Primary Examiner*—Steven Capella

[57] ABSTRACT

Water soluble precursors of ceramic compounds are emulsified in an organic fluid containing an organic surfactant. The emulsion is subsequently mildly heated at a pressure of about 0.05 atmospheres to remove the free water from the emulsion droplets. The resulting sludge consists of particles deriving from the dehydrated emulsion droplets. These particles may only be bound by the surfactant, all or most of the original organic fluid having been boiling off under low pressure. This sludge is then heated in a standard air atmosphere to char the surfactant, which char is to maintain the separation between the dried droplet-derived particles to prevent forming sintered or fused agglomerates thereof. With continued heating the transient char is subsequently burned off and the particles are calcined to controllably and simply produce a fine ceramic powder of spherical particles having a narrow size distribution and an average size in the particularly useful range of 0.1 micron to 1.0 micron.

8 Claims, No Drawings

EMULSION-CHAR METHOD FOR MAKING FINE CERAMIC POWDERS

BACKGROUND OF THE INVENTION

This invention relates to a process in which a ceramic powder is produced by forming an aqueous solution including precursors of the ceramic powder material, mixing to emulsify the aqueous solution in a water-immiscible fluid, and drying and separating the emulsion droplets.

Ceramic materials have been made by the thermal decomposition of metal organic resins. Such a method is described by M. Pechini in his U.S. Pat. No. 3,330,697 issued July 11, 1957, and assigned to the same assignee as is the present invention. Another such procedure is described in the paper by Hennings et al entitled "Thermal Decomposition of (BaTi) Citrates into Barium Titanates", Journal of Solid State Chemistry, Vol. 26, pages 329-338, 1978. These thermal methods provide highly homogenous bulk material but not powder.

Finely divided ceramic materials have been made by emulsifying an aqueous solution of a metal salt in a water-immiscible fluid. The water of the emulsion is then evaporated without boiling away a significant part of the water-immiscible fluid, and the emulsion is transformed into a metal-salt sol. Subsequently, the sol is caused to coagulate (flocculate) e.g., by heating and/or by the addition of a propanol, ethanol, or the like. The heating is also for simultaneously thermally decomposing the metal salt to produce a refractory powder.

Another method, dedicated to making alkali-earth-metal titanate powders, begins by forming alcoholates of each of the precursor metals, mixing the alcoholates and refluxing the mixture, adding water to the mixture to hydrolize the alkoxides and form a precipitate, separating the precipitate from the solution and drying the recovered titanate-precursor powder.

The later two processes, by which particles of metal compounds are separated by precipitation from a solution, are capable of producing fine powders, but inevitably some of the fine particles so produced agglomerate to form large particles.

It is also known to form an aqueous solution of the ceramic precursors mixed with corn syrup, or alternatively a sucrose solution, and heating until dry and charred. The resulting char is ignited in a furnace at 600° C. provided with excess air to burn off the carbonaceous material. However, this elementary process produces extremely fine particles, e.g. 500 angstroms (0.05 microns) and smaller that tend to form fused-together agglomerates even after comminution. Furthermore, vastly greater amounts of char are used, e.g. the weight of carbon convertible to char is 4 to 5 times the weight of the ceramic product. This would lead to difficulty in a production version of this laboratory process to control the highly exothermic burning of so much carbon and prevent the sintering and fusing of the particles. Furthermore this process inherently produces extremely fine spherical particles of a few hundred angstroms diameter whereas it is well known that the finer the particles the more difficult it is to produce ceramic slips wherein the particles are not agglomerated and the slip rheology is usable. The preferred particle size range for making ceramic dielectric articles is about from 0.1 to 1 micron (1000 to 10,000 angstroms).

There is described in the patent U.S. Pat. No. 4,654,075 issued Mar. 31, 1987 to Cipollini, assigned to the same assignee as is the present invention, a method for making ceramic and metal powders including forming an emulsion of water-soluble powder precursors in a water-immiscible organic fluid, and heating in an inert atmosphere to form a char of the organics in the original emulsion and finally calcining in air to remove the carbon from the char and react the ceramic precursors in each particle to form a fine ceramic or metal powder. Powders made by this method have a well controlled particle size of narrow distribution related directly to the droplet sizes of the parent emulsion.

It is an object of this invention to provide a simpler method dedicated to making finely divided ceramic powders.

It is a further object of this invention to provide such a method wherein initially the powder product precursors are dissolved in an aqueous solution that is emulsified in a water immiscible organic liquid to establish the ultimate sizes of the final powder particles, wherein the average ceramic particle size is within the range of 0.1 to 1.0 micron.

It is yet a further object of this invention to provide such a method wherein the emulsion is subjected to a low temperature drying step to form a sludge of spherical particles that is capable of being heated in air to transiently char and then to drive off all remaining organic materials and to calcine the spherical particles.

SUMMARY OF THE INVENTION

An aqueous solution is prepared of precursor compounds of a desired ceramic powder product. This aqueous solution is emulsified in a water-immicsible-organic fluid using an organic surfactant. The emulsion is then heated at a temperature of about 100° C. at a pressure less than 0.25 atmospheres and preferably to lower pressures in the range between 20 and 190 mm Hg (0.026 to 0.25 atmospheres). This emulsion heating step is to evaporate and remove free water from the emulsion droplets and to evaporate and remove at least a major portion of the organic fluid and preferably all of it.

The basic objective of this heating step is to form a sludge of dehydrated emulsion-droplet-derived particles bound but left separate by the surfactant, and of equal significance to get rid of the organic fluid, to the extent that the weight of the carbon left in the sludge which is attributable to the remaining organic fluid and surfactant is less than twice that of the ultimate ceramic powder product.

Subsequently, the sludge is heated in a standard air atmosphere to decompose the remaining organic fluid and surfactant to form a carbon-char matrix containing the dehydrated particles and to calcine and transform the particles to the desired ceramic powder product.

This process is considered to be an advance over the teachings in the aforementioned patent to Cipollini. A key difference lies in the use of a lower boiling hydrocarbon oil and an emulsion heating step that operates at a much lower temperature, e.g. 100° C. rather than to 200° C. and thus is capable of operation at a lower pressure, e.g. at below 190 mm Hg rather than half an atmosphere and above. These lower temperatures make the low pressures possible with little foaming and result in the necessary emulsion-heating time of about one third that of the prior art process.

The further and more important consequence of the use here of a lower boiling hydrocarbon is that the hydrocarbon can be completely removed even during this milder and faster emulsion-heating step, leaving much less carbonaceous material in the resulting sludge. This in turn makes possible the elimination of the reduced-oxygen-atmosphere-char step that is taught by Cipollini prior to the calcining step. In the process of this invention, a single step for calcining effects the charring and then the calcining. During an initial phase at the calcining step before charring occurs, some of the more readily decomposed organic materials that may be there, e.g. propanol, zirconyl acetate and some of the low boiling hydrocarbon if any, are removed, which materials would all have contributed to the carbon char matrix if a separate nitrogen-atmosphere char step had been used. Thus in the calcining step of the invention, a transient carbon-char matrix is formed that is made up of less carbon than the even reduced amount incorporated in the emulsion-derived sludge. As a consequence, the threat of an exothermic run-away condition during the burning off of the carbon is even further reduced.

However, the greatest distinguishing feature of the process of this invention over the prior art is perhaps its unique reliance upon such small amounts of carbon char to maintain separation of the particles during their initial calcine reactions to prevent their sintering, merging and increase in particle size. That feature is quite surprising in view of the teachings in the prior art.

Although the lowest practical carbon-char amount is not known, it has been calculated that for 0.1 micron barium titanate particles the weight of a conforming mono-atomic carbon layer would weigh about a half percent that of the barium titanate. The lowest practical carbon-char amount is believed to be a few times that, leading to a minimum acceptable ratio of the weights of carbon-char to ceramic of about 0.05.

The ceramic powder making process of this invention, which leads to great processing advantages, employs a small amount of carbon char while retaining all of the product advantages of the Cipollini process. These advantages include superb control of ceramic particle size depending directly upon emulsion droplet size, essentially perfect homogeneity of composition from particle to particle and capability for making an almost unlimited variety of ceramic powder compositions.

DESCRIPTION OF THE PREFERRED EMBODIMENTS

I. First preferred embodiment; process for making a 1 kilogram batch of barium zirconate powder:

Preparation of a Zirconyl Acetate Aqueous Phase

A 3.5 kilogram (Kg) quantity of n-propyl zirconate is added to 2.6 Kg of glacial acetic acid. The resulting zirconyl acetate is diluted to 8 liters with deionized distilled water. An assay for zirconia ($ZrO_2$) content is made by ignition at 1000° C. for 2 hours and found to be 11.6 weight percent $ZrO_2$.

To a 4.00 Kg portion of the diluted zirconyl acetate solution there is added a 2.10 Kg quantity of glacial acetic acid which are then thoroughly mixed. About 4 liters of deionized distilled water is then added and mixed in to produce a volume of 10 liters. To this mixture there is added 750.7 grams of barium carbonate which amounts to one mole of barium for each mole of $ZrO_2$. The mixture is heated to 70° C. to react the ingredients and form an aqueous solution of barium zirconyl acetate.

Preparation Of An Oil Phase

Into 25 liters of a high purity low boiling hydrocarbon there is added 500 grams of a surfactant, and the combination thoroughly mixed. The hydrocarbon is an isoparaffin solvent sold as ISOPAR G, a tradename of Exxon Company, a Division of Exxon Corporation, Houston, TX. This material has a boiling point range of 154° C. to 174° C. The term "boiling point" as used herein is the characteristic boiling temperature or temperatures of the subject material at a pressure of one atmosphere.

The particular surfactant used here is designated OLOA 1200, a tradename of Oronite Additions Division of the Chevron Chemical Company, Los Angeles, CA. It is a derivative of succinimide and polybutane and has a minimum decomposition temperature of 270° C. which is above the peak temperature of emulsion heating.

Emulsification

The 10 liters of the aqueous solution of barium zirconyl acetate, prepared as is described above, is added to a 15 liters portion of the above-described oil phase. This addition is made while mixing in the high shear Gifford-Wood Homo-Mixer. The resulting mixture is subsequently passed through the Gaulin Homogenizer (Model 15M-8TA made by A. P. V. Gaulin, Everett, Mass.) and mixed at a pressure of 3000 pounds per square inch (p.s.i.) in the first stage and 400 p.s.i. in the second stage. The emulsion is passed through the Gaulin homogenizer a second and a third time.

Heating to Remove Water and Hydrocarbon

Heating of the emulsion begins in a mild vacuum, e.g. between 30 mm and 100 mm Hg. When the temperature has risen to about 95° C., all of the water has been evaporated and carried away and most of the low boiling hydrocarbon has also been removed so that the volume of the remaining material is about 3.75 liters or 15% of the 25 liters of start emulsion. When the temperature rises further to 110° C. the bottoms are almost dry, all the water and all of the hydrocarbon oil having been removed except the surfactant that is too high boiling to have been removed under these mild distillation conditions. Thus, all that remains is a sludge of solid particles that are derived from the aqueous-emulsion droplets, which particles are slightly wetted by the surfactant. The weight of the carbon in the sludge, therefore, amounts to 1.9 Kg (1,814 gm in the precursor and 125 grams in the surfactant) so that the carbon in the sludge is 1.9 times the weight of the barium zirconate product.

Calcination

The barium zirconyl acetate sludge is then spread in a thin layer (e.g. 6 mm) and is heated in a standard air atmosphere. The oven temperature rises at a rate of 6.5° C./minute. When the temperature of the sludge rises to within 300° to 400° C. the acetate is gone and the surfactant decomposes producing a carbon char. Thus, at around 300° C. the sludge begins to turn black. With further heating to 600° C. it has turned completely white attributable to the carbon having been burned off. This heating continues till the temperature reaches 1000° C. and it is held at that temperature to effect the complete calcining and transformation of the particles into a very pure and near stoichiometric barium zirconate powder having spherical particles with an average particle size of about 0.2 micron (μm).

II. Second preferred embodiment:

Preparation of a Manganous Nitrate Aqueous Phase

A reagent grade manganous nitrate, $Mn(NO_3)_2$, was dissolved in deionized distilled water to produce a 0.57 molar manganous nitrate solution.

Preparation of an Oil Phase

Same as in the first preferred embodiment.

Emulsification

A 12 liters portion of the oil phase was mixed with 6 liters of the manganous nitrate aqueous phase in the high shear Gifford-Wood mixer. This mixture was then homogenized in the two-stage Gaulin homogenizer at 4000 p.s.i. in the first stage and at 600 p.s.i. in the second stage. It is passed through the homogenizer a total of three times.

Heating To Remove Water

Same as in second preferred embodiment. The weight of carbon in the sludge amounts to 0.37 times the weight of the manganese oxide product.

Calcination

The sludge is then heated in a standard air atmosphere to about 500° C. at which point the nitrate has been decomposed and the surfactant has become a char and is in the process of oxidation and removal.

Heating is continued to 750° C. at which the temperature is held for 2 hours to effect complete calcination and transformation of the particles into a black manganese oxide $Mn_2O_3$ powder, the particles having an average diameter of about 0.15 micron.

III. Third preferred embodiment:

Preparation of a Niobium Oxalate Aqueous Solution

Niobium oxalate is dissolved in an oxalic acid solution to produce a niobium oxalate aqueous solution containing the equivalent of 10 weight percent niobium pentoxide $Nb_2O_5$.

Preparation of the Oil Phase

Same as the first preferred embodiment.

Emulsification

A 1 liter portion of the niobium oxalate aqueous phase is mixed with 9 liters of the oil phase in the high shear Gifford-Wood mixer. The mixture was then homogenized at 3000 p.s.i. in the first stage and 450 p.s.i. in the second stage. It is passed through the homogenizer three times altogether.

Heating to Remove Water

Same as in the first preferred embodiment. The carbon in the sludge is only 1.1 times the weight of the niobium pentoxide powder product.

Calcination

The sludge is then heated in a standard air atmosphere to about 500° C. at which niobium oxalate is decomposed and the surfactant is in the process of decomposition. Heating is continued to 600° C. at which the temperature is held for three hours to effect complete calcination and transformation of the sludge particles to white powder of spherical particles of niobium-pentoxide $Nb_2O_5$, which particles have an average diameter of about 0.2 micron.

In the first and third preferred embodiment of this invention the only carbonaceous materials left in the dehydrated sludge prior to calcination is attributable respectively to the acetate and surfactant, and the oxalate and surfactant. In the second embodiment the only carbonaceous material in the sludge is surfactant. Such a low carbon content in the slurry or sludge resulting from the dehydration of the emulsion is highly desirable. Not only does leaving out carbonaceous material make the process simpler and more controllable but, furthermore, these very same advantages can also be realized in the subsequent char/calcining step, i.e. no separate special atmosphere char step is necessary.

The oxidation of carbon to carbon monoxide and carbon dioxide is a highly exothermic process. If meticulous care and control is not exercised during the burning off of concentrated amounts of carbon, the temperature of the ceramic particles can far exceed the ambient furnace temperature. This can result in the sintering and growth of the individual particles leading to particle sizes greatly in excess of the desired particle size range of from 0.1 to 1.0 microns.

In the process of the present invention in which there is formed an intermediate dehydrated sludge of surfactant-wetted emulsion-droplet-derived particles, comparatively little carbon is present, and the subsequent reduced-oxygen-atmosphere char step of the prior art can be omitted, skipping directly to a standard air atmosphere heating step to transiently char and then remove char, and to calcine and yield the desired fine pure ceramic powder.

IV. Fourth preferred embodiment:

Preparation of a Barium Titanium Aqueous Phase

A 3117.4 gram quantity of a titanium citrate solution, in which the titania amounts to 11% by weight and the citrate to titanium molar ratio is 1.3, is combined with 1500 ml of deionized distilled water. While stirring, 756.46 gm of anhydrous citric acid is added and dissolved in the solution. The solution is heated to 40° C. and 847.08 gm $BaCO_3$ is slowly added. The pH is adjusted to 5.4 using $NH_4OH$. This resulting solution is barium titanium citrate 2.22. Water is added to the solution to obtain a concentration of 0.1 mole barium-titanium citrate per 175 ml of solution. The volume produced amounts to about 7510 ml.

Preparation of an Oil Phase

Same as in the first preferred embodiment.

Emulsification

The 7.51 liters of aqueous barium titanate solution is added to 11.265 liters of the oil phase. In this embodiment the relative amounts of aqueous solution and oil phase are the same as in the first preferred embodiment. Mixing and homogenizing were also accomplished as in the first embodiment.

Heating To Remove Water and Hydrocarbon

Same as in the first preferred embodiment.

Calcination

Same as in the first preferred embodiment except the peak temperature is 900° C.

This fourth preferred embodiment is chosen for making a direct comparison with the first embodiment described in the Cipollini patent. Both methods are scaled for producing 1 kilogram of barium titanate powder. Compositions at key points in the process of the fourth preferred embodiment are summarized in Table 1 below. Table 2 provides a comparable summary of the Cipollini process. Both tables include an accounting of the source and amounts of carbon that is present at each key step.

TABLE 1

In the process of the fourth embodiment of this invention:

| | | Carbon Content |
|---|---|---|
| A. Ba/Ti Aqueous Phase | | |
| Volume | 7.51 liters | |
| Weight | 9.162 Kg | |
| Citric Acid | 1.83 Kg | 685 grams |
| B. Oil Phase | | |
| Volume | 11.265 liters | |
| Weight | 8.465 Kg | |
| Isopar G | 11.023 liters (8.245 Kg) | 7,067 grams |
| Surfactant | 220 grams | 94 |
| Total carbon content in this emulsion is 7.8 Kg | | |
| C. After Heating to Dehydrate the Emulsion | | |
| Citric Acid | 1.83 Kg | 685 grams |
| Surfactant | 220 grams | 94 |
| Total carbon content of dehydrated emulsion is 0.78 Kg | | |

TABLE 2

In the Cipollini process:

| | | Carbon Content |
|---|---|---|
| A. Ba/Ti Aqueous Phase | | |
| Volume | 7.51 liters | |
| Weight | 9.162 Kg | |
| Citric Acid | 1.83 Kg | 685 grams |
| B. Oil Phase | | |
| Volume | 17.8 liters | |
| Weight | 14.33 Kg | |
| Isopar M | 14.897 liters (11.66 Kg) | 9,988 grams |
| Mineral Oil | 2.629 liters (2.32 Kg) | 1,989 |
| Surfactant | 350.52 grams | 150 |
| Total carbon content in emulsion is 12.8 Kg | | |
| C. After Heating to Dehydrate the Emulsion | | |
| Citric Acid (complexed) | 0.82 Kg | 308 grams |
| Mineral Oil | 2.32 Kg | 1,989 |
| Surfactant | 350.5 grams | 150 |
| Total carbon content of dehydrated emulsion is 2.45 Kg | | |

Here it is clear that the milder heating step for removal of water in the process of the present invention leaves in the emulsion all of the start citric acid, essentially none of the start Isopar G hydrocarbon and all of the surfactant. On the other hand, in the Cipollini process the dehydrated emulsion contains some of the starting citric acid, none of the starting Isopar M hydrocarbon but all of the starting mineral oil and all of the starting surfactant.

Thus, an important result of the processing steps of the present invention through the heating step to dehydrate the emulsion is the smaller amount of carbonaceous material remaining in the sludge which made it conceivable to complete the powder making process by a subsequent single step; namely, the calcining step that may be executed in a standard air atmosphere with no additional caution against thermal run-away.

However, to our surprise we find that when we repeat our fourth preferred process embodiment except further including in the oil phase 15 percent of the higher boiling hydrocarbon Isopar M (with B.P. of 207°–260° C.), identical product is obtained with no thermal runaway problems at calcining. In that case, the weight of all the carbon in the sludge/dispersion amounts to 1.8 Kg of carbon and the total carbon attributed to only the hydrocarbon and the surfactant then amounts to 1.2 times the weight of the barium titanate product.

From the aforementioned references to Pechini and to Hennings et al that as the temperature begins to rise in a standard air atmosphere at calcining, the first reaction that occurs is a partial decomposition of the ceramic-precursor citrate and escape of about 1/6 of its carbon as gaseous CO and $CO_2$. The citrates are by far the most refractory of all of the precursors that are expected to be useful. They begin to decompose and produce carbon dioxide at about 230° C. Other ceramic precursors such as propanol and zirconyl acetate are completely decomposed at 200° C. Furthermore, any of the low-boiling hydrocarbon that is left in the emulsion is completely boiled off at temperatures just over 270° C. This leads to less carbon in the subsequently formed chars and greater control and stability at the calcining step. On the other hand, all or a substantial portion of the carbon i the high molecular weight surfactant is converted temporarily to carbon which keeps the particles separated while the calcining reactions are taking place. Thus, a smaller amount of char is produced at calcining in air according to this invention than when heating to char in a reduced oxygen atmosphere, even when the dehydrated emulsion is the same.

Therefore, when calcining in air without the intermediate reduced oxygen atmosphere charring step, the char produced comes from the amount of carbon in the sludge less that in the remaining low-boiling organic fluid and less that in at least some of the ceramic precursors which will be unavailable to produce char, and not the entire carbon content of the dehydrated emulsion. That potentially char producing carbon content is calculated assuming that only 1/6 of the carbon in the precursors is lost prior to the calcining temperature reaching 300° C. (as for the citrates) at which char begins to form for each of the first through the fourth preferred embodiments, and is respectively 1.57, 0.37, 0.98 and 0.66 times the weight of the ceramic powder product. These potential carbon char amounts are comparatively small, e.g. the carbon weight in the precursor, mineral oil and surfactant remaining in the dehydrated emulsion of Cipollini amounting to 2.4 times the barium titanate powder product there.

In the four preferred embodiments described above, the dispersion or sludge remaining after the heating to dehydrate the emulsion is very nearly dry and containing essentially none of the original oil. Those embodiments were executed on a batch basis. However, if those processes were conducted on a continuous basis then it may be desirable to have a dispersant or sludge that is pumpable. In that case, one might heat the emulsion just long enough to retain 15–20% of the Isopar G or might add a similar minor quantity of a higher boiling hydrocarbon e.g. Isopar M, to the oil that remains dominantly Isopar G. The heating to dehydrate the emulsion may be conducted under the same mild conditions but in this case leaving hydrocarbon in the dispersion and rendering it pumpable. The higher boiling hydrocarbon addition would, of course, be decomposed at calcining in air producing more carbon char. This compromise should not be allowed to add so much carbon to the dehydrated emulsion that the weight of the available carbon to produce char at above 300° C. in the calcining step has reached twice that of the ceramic powder product in order to maintain control of the carbon oxidation reaction.

What is claimed is:

1. A ceramic powder-making method comprising:
   (a) preparing water soluble precursor compounds of a desired ceramic powder product, forming an aqueous solution of said compounds, and forming an emulsion comprised of a water-immiscible-organic fluid, an organic surfactant, and a suspension of droplets of said aqueous solution in said water-immiscible organic fluid;
   (b) heating said emulsion at a temperature up to approximately 100° C. and at a pressure of less than 0.25 standard atmospheres (190 mm Hg),
   to evaporate and remove free water from said droplets,
   to evaporate and remove a major portion and leave no more than a minor portion of said organic fluid and to leave essentially all of said surfactant,
   to produce a sludge of dehydrated emulsion-droplet-derived particles bound in said surfactant and said remaining minor portion of said organic fluid, and
   to render the weight of the carbon in all the organic material portion of said sludge that includes the remaining portions respectively of said organic fluid, of said surfactant and of the organic ones of said ceramic precursor compounds, and that is capable of surviving heating to 300° C., less than twice the weight of said desired product; and
   (c) heating and raising the temperature of said sludge in a standard air atmosphere to decompose said surfactant to form a transient carbon-char matrix containing said particles and to calcine and transform said particles to said desired ceramic; and continuing to heat to oxidize and remove said carbon-char matrix to leave only said ceramic powder product.

2. The method of claim 1 wherein at said pressure of said emulsion-heating step said temperature of said emulsion heating step is less than the decomposition temperature of said surfactant.

3. The method of claim 1 wherein said pressure of said emulsion-heating step is within the range of 20 to 190 mm Hg.

4. The method of claim 1 wherein said organic fluid is composed of a hydrocarbon having a characteristic boiling temperature within the range from 120° C. to 200° C.

5. The method of claim 4 wherein said emulsion heating is stopped only after essentially all of said organic fluid is boiled off and removed, and said weight of said carbon is less than 1.0 times that of said ceramic product.

6. The method of claim 4 wherein said emulsion heating is stopped after about 85% of said organic fluid, said major portion, has boiled away to leave about 15% of said organic fluid, said minor portion, in said sludge to render said sludge pumpable.

7. The method of claim 1 wherein said water immiscible organic fluid is composed of a low boiling hydrocarbon having a boiling temperature between 120° C. and 200° C. and of up to 15 weight percent of a high boiling hydrocarbon having a boiling temperature greater than 200° C., and wherein said low boiling hydrocarbon is said major portion and said high boiling hydrocarbon is said minor portion to render said sludge pumpable.

8. The method of claim 1 wherein said organic surfactant has a minimum decomposition temperature that is substantially greater than the peak temperature at said emulsion heating.

* * * * *